(12) United States Patent
Fisher et al.

(10) Patent No.: US 9,382,153 B2
(45) Date of Patent: Jul. 5, 2016

(54) CALCIUM SULPHATE-BASED PRODUCTS AND METHODS FOR THE MANUFACTURE THEREOF

(75) Inventors: Robin Daniel Fisher, Loughborough (GB); Jan Rideout, Rothley (GB)

(73) Assignee: Saint Gobain Placo SAS (FR)

( * ) Notice: Subject to any disclaimer, the term of this patent is extended or adjusted under 35 U.S.C. 154(b) by 0 days.

(21) Appl. No.: 13/988,845

(22) PCT Filed: Nov. 23, 2011

(86) PCT No.: PCT/GB2011/052298
§ 371 (c)(1),
(2), (4) Date: May 22, 2013

(87) PCT Pub. No.: WO2012/069826
PCT Pub. Date: May 31, 2012

(65) Prior Publication Data
US 2013/0239848 A1 Sep. 19, 2013

(30) Foreign Application Priority Data
Nov. 23, 2010 (GB) .................... 1019841.4

(51) Int. Cl.
*C04B 28/14* (2006.01)
*C04B 14/00* (2006.01)
C04B 111/28 (2006.01)

(52) U.S. Cl.
CPC .................. *C04B 14/00* (2013.01); *C04B 28/14* (2013.01); *C04B 2111/28* (2013.01)

(58) Field of Classification Search
CPC ........ C04B 28/14; C04B 14/00; C04B 22/16; C04B 24/12; C04B 2111/28; C04B 2103/12
USPC ................................. 106/772, 775
See application file for complete search history.

(56) References Cited

U.S. PATENT DOCUMENTS

| | | | |
|---|---|---|---|
| 2,216,207 A * | 10/1940 | Menaul | 106/773 |
| 3,376,147 A | 4/1968 | Dean | |
| 3,502,490 A | 3/1970 | Ware | |
| 4,502,490 A * | 3/1985 | Evans et al. | 600/593 |
| 4,564,544 A | 1/1986 | Burkard et al. | |
| 4,647,486 A | 3/1987 | Ali | |
| 5,746,822 A | 5/1998 | Espinoza et al. | |
| 6,228,163 B1 | 5/2001 | Espinoza et al. | |
| 6,409,824 B1 * | 6/2002 | Veeramasuneni et al. | 106/772 |
| 6,610,756 B1 * | 8/2003 | Shimizu et al. | 521/103 |
| 7,776,170 B2 | 8/2010 | Yu et al. | |
| 2001/0001218 A1 | 5/2001 | Luongo | |
| 2002/0045074 A1 | 4/2002 | Yu et al. | |
| 2007/0044688 A1 | 3/2007 | Blackburn et al. | |
| 2008/0087366 A1 | 4/2008 | Yu et al. | |
| 2010/0056655 A1 | 3/2010 | Liu et al. | |
| 2010/0136259 A1 | 6/2010 | O'Keefe | |
| 2010/0247937 A1 | 9/2010 | Liu et al. | |

FOREIGN PATENT DOCUMENTS

| | | | | |
|---|---|---|---|---|
| CN | 1990413 A | | 7/2007 | |
| GB | 2470401 A | | 11/2010 | |
| JP | 49099126 A | * | 9/1974 | |
| JP | 49106522 A | * | 10/1974 | |
| JP | 49125424 | | 11/1974 | |
| JP | 49125424 A | * | 11/1974 | |
| JP | 57088052 A | * | 6/1982 | |
| JP | 4125106 A | | 9/1990 | |
| JP | 2006143533 A | * | 6/2006 | |
| WO | 9946215 A | | 9/1999 | |
| WO | 0006518 A1 | | 2/2000 | |
| WO | WO 0006518 A1 | * | 2/2000 | |
| WO | 0145932 A | | 6/2001 | |
| WO | 03043955 A1 | | 5/2003 | |
| WO | WO2008/043085 A1 | * | 4/2008 | ............ C01F 11/46 |

OTHER PUBLICATIONS

PCT International Search Report for PCT/GB2011/052298 dated Apr. 5, 2012.
Haizhu Guo et al., Handbook of Practical Refractory Materials, 2000, pp. 510-512, China Building Materials Press, China.
Haizhu Guo et al., Handbook of Practical Refractory Materials, Aug. 2000, pp. 510-512, China Building Materials Industry Press, China.

* cited by examiner

*Primary Examiner* — Anthony J Green
(74) *Attorney, Agent, or Firm* — GrayRobinson, P.A.; Michael J. Colitz, III

(57) ABSTRACT

The invention provides a calcium sulphate-based product comprising a phosphate as additive for increased fire resistance. Particularly preferred phosphate additives may be those containing aluminum or ammonium ions.

17 Claims, No Drawings

CALCIUM SULPHATE-BASED PRODUCTS AND METHODS FOR THE MANUFACTURE THEREOF

CLAIM OF PRIORITY

This application is a continuation of and claims priority under 35 U.S.C. §371 to International Application No. PCT/GB2011/052298 filed on Nov. 23, 2011, which in turn claims priority to GB 1019841.4 filed on Nov. 23, 2010. The contents of both these applications are incorporated herein by reference for all purposes.

The present invention relates to calcium sulphate-based products, in particular calcium sulphate-based products having improved fire resistance, and to methods for the manufacture thereof.

Pre-fabricated components made of calcium sulphate are well-known for use in buildings. Such products may include gypsum plasterboards, partition panels, ceiling tiles and fibre-reinforced boards.

In many applications of these products, e.g. providing linings for lift shafts or for rooms containing valuable data, there is a need for the calcium sulphate-based products to meet or exceed regulatory criteria for fire resistance. In any case, it is generally desirable for fire resistance of building components to be improved.

It is known use aluminium and/or silicate additives to improve the fire-resistance of calcium sulphate-based products, as described e.g. in U.S. Pat. No. 4,647,486, U.S. Pat. No. 3,376,147, U.S. Pat. No. 7,776,170, U.S. Pat. No. 4,664,707, WO9946215, and U.S. Pat. No. 4,564,544.

The process of manufacturing calcium sulphate-based products such as gypsum board typically includes the steps of providing a quantity of particles of calcined gypsum, mixing these with water and possibly other additives, and allowing the mixture to set, so that it takes up the desired shape for the product. The calcined gypsum (also known as stucco) contains calcium sulphate compounds having a low bound water content (compared to calcium sulphate dihydrate). These calcium sulphate compounds may include e.g. calcium sulphate hemihydrate and calcium sulphate anhydrite.

The hemihydrate form of calcium sulphate is categorised into two basic forms: the alpha-hemihydrate and the beta-hemihydrate. The beta-hemihydrate (β plaster) is typically formed by heating gypsum under atmospheric conditions, to drive off any moisture and chemically combined water to form dried crystals, which may then be ground to a fine powder. The alpha-hemihydrate (α plaster) is typically formed by heating gypsum under pressure to remove the water associated therewith.

The step of allowing the mixture to set generally involves allowing the calcined particles to hydrate, so that they form gypsum (calcium sulphate dihydrate).

At its most general, the present invention may provide calcium sulphate-based products containing phosphate additives, and methods for the production thereof.

In a first aspect, the present invention may provide a method of manufacture of a calcium sulphate-based product having increased fire resistance, comprising the steps of:
  providing a stucco slurry comprising a mixture of stucco, water, and one or more phosphate additives; and
  allowing the stucco in the mixture to hydrate and set.

The stucco may comprise calcium sulphate hemihydrate and other calcium sulphate compounds having a lower bound water content than calcium sulphate dihydrate (e.g. calcium sulphate anhydrite). For example, the stucco slurry may comprise α plaster and/or β plaster.

Typically, the stucco slurry is set in the shape of a board, e.g. for lining walls.

The phosphate additive may be mixed with the stucco before or after addition of the water.

The phosphate additive may be a salt or an acid, and may be an orthophosphate or a polyphosphate. Preferably, the phosphate additive is a divalent or trivalent phosphate compound, that is, the compound comprises two or three phosphoric acid units (in the case of an acid) or two or three phosphate units (in the case of a salt).

However, in certain embodiments, the phosphate additive may be an acid comprising less than two phosphoric acid units or a salt comprising less than two phosphate units. That is, the phosphate additive may be an acid comprising a single phosphoric acid unit or a salt comprising a single phosphate unit.

In the case that the phosphate additive is a salt comprising two or more phosphate units, it is preferred that the phosphate additive is substantially insoluble in water.

Typically the phosphate additive is one of the following additives: sodium phosphate, potassium phosphate, lithium phosphate, calcium phosphate (e.g. calcium pyrophosphate, monetite, or brushite (calcium phosphate dihydrate)), magnesium phosphate, magnesium phosphate dibasic trihydrate, magnesium phosphate hydrate, zinc phosphate, aluminium phosphate, diammonium hydrogen phosphate, ammonium dihydrogen phosphate, ammonium magnesium phosphate, ammonium aluminium phosphate, ammonium polyphosphate, potassium aluminium phosphate, sodium aluminium phosphate, aluminium metaphosphate, copper hydroxide phosphate, or boron phosphate. Preferably, the phosphate additive comprises aluminium, e.g. it may be aluminium phosphate, potassium aluminium phosphate, aluminium metaphosphate or sodium aluminium phosphate. Other preferred phosphate additives include diammonium hydrogen phosphate, ammonium polyphosphate and ammonium dihydrogen phosphate. Most preferably, the phosphate additive is aluminium phosphate, diammonium hydrogen phosphate, ammonium aluminium phosphate, ammonium polyphosphate, or ammonium dihydrogen phosphate.

In certain embodiments, however, it is preferred that the phosphate additive is a compound other than aluminium phosphate. In this case, the term "aluminium phosphate" covers stoichiometric and non-stoichiometric compounds of aluminium phosphate, as well as aluminium phosphate compounds comprising hydrogen ions. It does not cover phosphate additives comprising ions other than aluminium ions, phosphate ions or hydrogen ions.

It has been found that the addition of a phosphate additive to the stucco and water mix results in a calcium sulphate-based product (e.g. a gypsum product such as a wallboard or ceiling panel) that has improved fire resistance. It is thought that the improved fire resistance is due to the similar sizes of sulphate and phosphate ions. This similarity in ion size may allow for the formation of relatively stable compounds when ionic diffusion occurs at the high temperatures present in a fire. That is, it is thought that when high temperatures cause sulphate ions to diffuse away from calcium ions within the calcium sulphate compounds, the phosphate ions may replace the sulphate ions, without causing substantial changes in the structure of calcium compound. Thus, the presence of phosphate ions may help to avoid the introduction of internal stresses into the calcium compound, and help to retain the mechanical integrity of the product.

Since the calcium sulphate-based product may be better able to retain its mechanical integrity at high temperatures, such as 750° C., the amount of material required for e.g. a gypsum board product may be reduced. This reduction in material may be achieved e.g. by reducing the weight of the board or its thickness (caliper).

The phosphate additive may be provided in the form of an aqueous solution of the phosphate salt. It is thought that in this case, some phosphate additives may remain in liquid solution after the setting of the stucco slurry, and this liquid solution may delay dehydration of the calcium sulphate-based product, so that during a fire (or other high-temperature incident), shrinkage of the product may be delayed until higher temperatures are reached.

As a preferred alternative, the phosphate additive may be substantially insoluble in water, e.g. it may be monetite, brushite, copper hydroxide phosphate, boron phosphate, magnesium phosphate, calcium pyrophosphate, aluminium metaphosphate, or ammonium polyphosphate. It is thought that in this case, there will be little or no interference of the phosphate additive in the setting reaction of the stucco slurry. As an example, the phosphate additive may be provided by the neutralization of aluminium phosphate to e.g. pH 6 using e.g. calcium hydroxide or another suitable alkaline material. Similarly, in certain preferred embodiments, the phosphate additive may be provided by the neutralization of aluminium phosphate to e.g. pH 7 using e.g. ammonium hydroxide.

In certain cases, it is preferred that the phosphate additive has a pH greater than pH 5.0, preferably greater than pH 5.5, most preferably greater than pH 6.0. This control over the pH of the phosphate additive may help to limit acidification of the stucco slurry. It is thought that acidification of the slurry may cause $CO_2$ to be released from any calcium carbonate and/or magnesium carbonate impurities that are present in the slurry. The release of $CO_2$ may result in difficulty in controlling the density of the calcium sulphate-based product.

In certain cases, ammonium polyphosphate is preferred, since it is highly effective at delaying the shrinkage of gypsum to higher temperatures, while having a manageable effect on setting characteristics of the slurry (that is, it is considered to accelerate the nucleation and thus reduce the hydration time).

In the case that the phosphate additive is aluminium phosphate, it is thought that the aluminium phosphate provides an amorphous gel that coats the calcium sulphate particles (e.g. gypsum), as the stucco slurry sets.

It is also thought that aluminium phosphate additives may reduce shrinkage of calcium sulphate-based products at high temperatures, possibly by acting as a thermal barrier to delay dehydration of the calcium sulphate. In addition, the aluminium phosphate may help to bind the calcium sulphate together in the early stages of a fire if dehydration occurs. Aluminium phosphate is also considered to have good high temperature stability.

In general, it is thought that aluminium phosphate has good high temperature chemical stability, high temperature strength, abrasion resistance, thermal shock resistance, and thermal insulation properties, as well as chemical compatibility with other optional components of calcium sulphate-based products, such as metals, aluminium oxides and silicon oxides.

Typically, in the case that the phosphate additive is aluminium phosphate, the phosphate additive is provided as $Al(H_2PO_4)_3$ (aluminium dihydrogen phosphate).

Typically, the phosphate additive is added to the stucco slurry in a quantity of 0.5-30 wt %, in relation to the dry weight of the slurry. Preferably, the phosphate additive is added to the stucco slurry in a quantity of 1-15 wt %, in relation to the dry weight of the slurry. More preferably, the phosphate additive is added to the stucco slurry in a quantity of 1.5-10 wt %, in relation to the dry weight of the slurry.

Typically, the phosphate additive comprises at least 2 wt % in relation to the dry weight of the slurry, preferably at least 3 wt %, most preferably at least 3.5 wt %.

Typically, in the case that the phosphate additive is aluminium phosphate, $Al^{3+}$ and $H_2PO_4^-$ ions are present in the slurry in a molar ratio of three $H_2PO_4^-$ ions to one $Al^{3+}$ ion. In the case that the $H_2PO_4^-$ ions and $Al^{3+}$ ions are present in a non-stoichiometric ratio, it is preferred that there are <$3H_2PO_4^-$ ions to one $Al^{3+}$ ion.

In a less preferred variant, phosphoric acid and aluminium may be added separately to the slurry.

It is thought that when the phosphate additive is aluminium phosphate, the aluminium phosphate reacts with the calcium sulphate at high temperatures (e.g. 1000° C.) to form $Ca_9Al(PO_4)_7$ and $AlPO_4$. These compounds may be present as a network of crystallites. At lower temperatures (e.g. 150-500° C.), it is thought that the aluminium phosphate provides an amorphous binder.

It has been found that the addition of phosphate additives tends to increase the setting time of the stucco slurry i.e. the time taken for it to hydrate to form gypsum. This is particularly the case if phosphate additive is provided as an aqueous solution and/or if the phosphate additive is aluminium phosphate. Thus, in general, the method of the first aspect of the invention includes the further step of adding an accelerator to the stucco slurry.

The accelerator may be, e.g., freshly ground gypsum having an additive of surfactant or sugar. Such accelerators may include Ground Mineral NANSA (GMN), heat resistant accelerator (HRA), and ball milled accelerator (BMA). Alternatively the accelerator may be a chemical additive such as aluminium sulphate, zinc sulphate, or potassium sulphate. In certain cases, a mixture of accelerators may be used, e.g. GMN in combination with a sulphate accelerator. As a further alternative, ultrasound may be used to accelerate the setting rate of the stucco slurry e.g. as described in US 2010/0136259

It has been found that surprisingly high proportions of accelerator may be required to achieve set of the stucco within a practical timescale. Thus, typically the accelerator is added to the stucco slurry in a quantity of 0.01-5 wt %, preferably 1-5 wt %, more preferably 2-5 wt %.

The accelerator is typically added to the stucco slurry in the mixer in which the stucco and water are mixed. However, the accelerator may be added downstream of the mixer e.g. at the mixer outlet.

As an alternative to adding phosphate additives to the stucco slurry, the present invention may provide, at a general level, a method of incorporating phosphate additives into a calcium sulphate-based product by impregnating a set calcium sulphate-based product with a solution comprising phosphate ions.

Thus, in a second aspect, the present invention may provide a method of manufacture of a treated calcium sulphate-based product having increased fire resistance, comprising the steps of:

causing a stucco slurry to hydrate, to provide a set calcium sulphate-based product; and impregnating the set calcium sulphate-based product with a solution comprising a phosphate additive.

This method requires that the phosphate additive is soluble, typically soluble in water. In general, phosphate additives having a monovalent cation may be used to provide a suitable aqueous solution. Such phosphates include lithium phosphate, sodium phosphate, and potassium phosphate. Diammonium hydrogen phosphate and ammonium dihydrogen phosphate may also be suitable, as well as acidic phosphates such as calcium dihydrogen phosphate monohydrate and aluminium phosphate. The double salts ammonium magnesium phosphate, sodium aluminium phosphate and ammonium aluminium phosphate may also be suitable in this application.

The following phosphate additives may also be suitable, but are less preferred: calcium phosphate (e.g. calcium pyrophosphate, monetite, or brushite (calcium phosphate dihydrate)), magnesium phosphate, magnesium phosphate dibasic trihydrate, magnesium phosphate hydrate, zinc phosphate, potassium aluminium phosphate, aluminium metaphosphate, copper hydroxide phosphate, or boron phosphate. The phosphate additive may be a salt or an acid.

Typically, the phosphate additive is a compound other than aluminium phosphate. In this case, the term "aluminium phosphate" covers stoichiometric and non-stoichiometric compounds of aluminium phosphate, as well as aluminium phosphate compounds comprising hydrogen ions. It does not cover phosphate additives comprising ions other than aluminium ions, phosphate ions or hydrogen ions.

However, in certain embodiments, the phosphate additive may be aluminium phosphate. For example, the solution may be an aqueous solution of aluminium dihydrogen phosphate.

The phosphate additive may have further optional features as described in relation to the first aspect of the invention.

Preferably, the solution comprises ammonium ions. For example, the solution may be an aqueous solution of $NH_4H_2PO_4$ or $(NH_4)_2HPO_4$.

Typically, the impregnation step may be carried at a reduced air pressure (e.g. under vacuum). However, in foamed products, this may not be necessary.

Typically, after the impregnation step, the calcium sulphate-based product may be dried using conventional drying equipment at a temperature of 30-90° C., preferably 35-80° C., most preferably 40-60° C. In some cases, this drying step may be carried out by returning the calcium sulphate-based product to the dryer that was originally used for the step of drying the calcium sulphate-based product.

The method of the second aspect of the invention may provide a calcium sulphate-based product comprising a phosphate additive. The inclusion of a phosphate additive within a calcium sulphate-based product is thought to increase fire resistance of the calcium sulphate-based product, as discussed above in relation to the first aspect of the invention.

In a third aspect, the present invention provides a calcium sulphate-based product having increased fire resistance, comprising a phosphate additive.

The phosphate additive may be a salt or an acid. Typically the phosphate additive is one of the following additives: sodium phosphate, potassium phosphate, lithium phosphate, calcium phosphate (e.g. calcium pyrophosphate, monetite, or brushite (calcium phosphate dihydrate)), magnesium phosphate, magnesium phosphate dibasic trihydrate, magnesium phosphate hydrate, zinc phosphate, aluminium phosphate, diammonium hydrogen phosphate, ammonium dihydrogen phosphate, ammonium magnesium phosphate, ammonium aluminium phosphate, ammonium polyphosphate, potassium aluminium phosphate, sodium aluminium phosphate, aluminium metaphosphate, copper hydroxide phosphate, or boron phosphate.

Typically, the phosphate additive is a compound other than aluminium phosphate. In this case, the term "aluminium phosphate" covers stoichiometric and non-stoichiometric compounds of aluminium phosphate, as well as aluminium phosphate compounds comprising hydrogen ions. It does not cover phosphate additives comprising ions other than aluminium ions, phosphate ions or hydrogen ions.

However, in certain embodiments, the phosphate additive may be aluminium phosphate.

In a preferred embodiment, the phosphate additive comprises ammonium ions. For example, the phosphate additive may be $NH_4H_2PO_4$, $(NH_4)_2HPO_4$, ammonium aluminium phosphate, or ammonium polyphosphate.

The phosphate additive may have further optional features as described in relation to the first aspect of the invention.

The inclusion of a phosphate additive within the calcium sulphate-based product is thought to increase fire resistance of the calcium sulphate-based product, as discussed above in relation to the first aspect of the invention.

The following worked examples are given by way of illustration only.

EXAMPLE 1

Gypsum cylinders ((a) and (b)) were produced from 140 g of 5 wt % $Al(H_2PO_4)_3$ solution and 200 g of β plaster, mixed by hand for 10 seconds. The slurry included 1.5 wt % Ground Mineral NANSA (GMN), that is, GMN made up 1.5 wt % of the dry weight of the plaster. The slurry was allowed to set and dried at 40° C. to provide samples for dilatometry measurements. The setting time was also measured.

EXAMPLE 2

Gypsum cylinders ((a) and (b)) were produced from 140 g of 2.5 wt % $Al(H_2PO_4)_3$ solution and 200 g of β plaster, mixed for 10 seconds in a food blender. The $Al(H_2PO_4)_3$ solution included additionally CaOH in an amount sufficient to bring the pH of the solution to pH 6. The slurry included 1.5 wt % ground mineral NANSA (GMN), that is, GMN made up 1.5 wt % of the dry weight of the plaster. The slurry was allowed to set and dried at 40° C. to provide samples for dilatometry measurements. The setting time was also measured.

EXAMPLE 3

Gypsum cylinders were produced from 100 g of water and 100 g of α plaster, mixed by hand with a spatula. The slurry included 5 g $AlPO_4$ powder, that is, 5 wt % in relation to the dry weight of the plaster. The slurry was allowed to set and dried at 40° C. to provide samples for shrinkage measurements. The setting time was also measured.

EXAMPLE 4

Gypsum cylinders were produced from 100 g of water and 100 g of α plaster, mixed by hand with a spatula. The slurry included 10 g $AlPO_4$ powder, that is, 10 wt % in relation to the dry weight of the plaster. The slurry was allowed to set and dried at 40° C. to provide samples for shrinkage measurements. The setting time was also measured.

EXAMPLE 5

A gypsum cylinder produced from the method described in comparative example 4 was impregnated with a 5M solution of $Al(H_2PO_4)_3$ in water by vacuum and dried at 40° C.

EXAMPLE 6

A gypsum cylinder produced from the method described in comparative example 4 was impregnated with a 0.5M solution of $NH_4H_2PO_4$ in water and dried at 40° C.

EXAMPLE 7

A gypsum cylinder produced from the method described in comparative example 4 was impregnated with a 1M solution of $NH_4H_2PO_4$ in water and dried at 40° C.

EXAMPLE 8

A gypsum cylinder produced from the method described in comparative example 4 was impregnated with a 0.5M solution of $(NH_4)_2HPO_4$ in water and dried at 40° C.

EXAMPLE 9

A gypsum cylinder produced from the method described in comparative example 4 was impregnated with a 1M solution of $(NH_4)_2HPO_4$ in water and dried at 40° C.

EXAMPLE 10

Gypsum cylinders were produced from α plaster and 5M $Al(H_2PO_4)_3$ solution, mixed by hand with a spatula in a 1:1 ratio by weight. The slurry was allowed to set and dried at 40° C. to provide samples for shrinkage measurements. The setting time was also measured.

EXAMPLE 11

Gypsum cylinders were produced from α plaster and 5M $Al(H_2PO_4)_3$ solution, mixed by hand with a spatula in a 1:1 ratio by weight. The slurry included 3 wt % GMN in relation to the dry weight of the plaster. The slurry was allowed to set and dried at 40° C. to provide samples for shrinkage measurements. The setting time was also measured.

EXAMPLE 12

Gypsum slurry was produced from 500 ml of water at 40° C. and 500 g of calcium sulphate β-hemihydrate plaster and mixed for 10 seconds in a Kenwood™ Chef Classic blender on a 'low' speed. The slurry included 12.5 g of aluminium metaphosphate, from Sigma-Aldrich.

A portion of the slurry was added to a 150 ml polystyrene cup that was provided with polyurethane thermal insulation. The temperature of the slurry was then measured at regular intervals using a type K thermocouple and the results recorded using a data-logger. These measurements allowed the hydration time (that is, the time to maximum temperature) to be determined.

The other portion of the slurry was poured into moulds and allowed to set to provide gypsum cylinders. After drying at 40° C., the samples were analysed using a dilatometer.

EXAMPLE 13

A gypsum slurry and gypsum cylinders were prepared using the method of Example 12, with the difference that the phosphate additive was 12.5 g of calcium phosphate dibasic (from Sigma-Aldrich), rather than aluminium metaphosphate.

EXAMPLE 14

A gypsum slurry and gypsum cylinders were prepared using the method of Example 12, with the difference that the phosphate additive was 12.5 g of calcium pyrophosphate (from Sigma-Aldrich), rather than aluminium metaphosphate.

EXAMPLE 15

A gypsum slurry and gypsum cylinders were prepared using the method of Example 12, with the difference that the phosphate additive was 12.5 g of magnesium phosphate dibasic trihydrate (from Sigma-Aldrich), rather than aluminium metaphosphate.

EXAMPLE 16

A gypsum slurry and gypsum cylinders were prepared using the method of Example 12, with the difference that the phosphate additive was 12.5 g of aluminium phosphate monohydrate (from Sigma-Aldrich), rather than aluminium metaphosphate.

EXAMPLE 17

A gypsum slurry and gypsum cylinders were prepared using the method of Example 12, with the difference that the phosphate additive was 12.5 g of calcium bis(dihydrogen phosphate) monohydrate (from Sigma-Aldrich), rather than aluminium metaphosphate.

EXAMPLE 18

A gypsum slurry and gypsum cylinders were prepared using the method of Example 12, with the difference that the phosphate additive was 12.5 g of aluminium phosphate ($AlPO_4$) (from Sigma-Aldrich), rather than aluminium metaphosphate.

EXAMPLE 19

A gypsum slurry and gypsum cylinders were prepared using the method of Example 12, with the difference that the phosphate additive was 12.5 g of aluminium phosphate monohydrate (from Sigma-Aldrich), rather than aluminium metaphosphate. Before its addition to the slurry, the aluminium phosphate monohydrate was neutralized to pH 7 using ammonium hydroxide.

EXAMPLE 20

A gypsum slurry and gypsum cylinders were prepared using the method of Example 12, with the difference that the phosphate additive was 12.5 g of ammonium polyphosphate (silane coated, from Polymer Tailoring Ltd), rather than aluminium metaphosphate.

EXAMPLE 21

A gypsum slurry and gypsum cylinders were prepared using the method of Example 12, with the difference that the phosphate additive was 12.5 g of ammonium polyphosphate (from Clariant), rather than aluminium metaphosphate.

EXAMPLE 22

A gypsum slurry and gypsum cylinders were prepared using the method of Example 12, with the difference that the phosphate additive was 5 g of ammonium polyphosphate (from Clariant), rather than aluminium metaphosphate.

COMPARATIVE EXAMPLE 1

Gypsum cylinders ((a) and (b)) were produced from 140 g of water and 197 g of β plaster, mixed for 10 seconds by hand. The slurry included 3 g of alumina. The slurry was allowed to set and dried at 40° C. to provide samples for dilatometry measurements.

COMPARATIVE EXAMPLE 2

Gypsum cylinders ((a) and (b)) were produced from 140 g of water and 197 g of β plaster, mixed for 10 seconds by hand. The slurry included 3 g of microsilica. The slurry was allowed to set and dried at 40° C. to provide samples for dilatometry measurements.

COMPARATIVE EXAMPLE 3

Gypsum cylinders ((a) and (b)) were produced from 140 g of water and 200 g of β plaster, mixed for 10 seconds by hand. The slurry was allowed to set and dried at 40° C. to provide samples for dilatometry measurements.

COMPARATIVE EXAMPLE 4

Gypsum cylinders were produced from 100 g of water and 100 g of α plaster, mixed by hand with a spatula. The slurry was allowed to set and dried at 40° C. to provide samples for shrinkage measurements.

COMPARATIVE EXAMPLE 5

Gypsum slurry was produced from 500 ml of water at 40° C. and 500 g of calcium sulphate β-hemihydrate plaster and mixed for 10 seconds in a Kenwood™ Chef Classic blender on a 'low' speed.

A portion of the slurry was added to a 150 ml polystyrene cup that was provided with polyurethane thermal insulation. The temperature of the slurry was then measured at regular intervals using a type K thermocouple and the results recorded using a data-logger. These measurements allowed the hydration time (that is, the time to maximum temperature) to be determined.

The other portion of the slurry was poured into moulds and allowed to set to provide gypsum cylinders. After drying at 40° C., the samples were analysed using a dilatometer.

COMPARATIVE EXAMPLE 6

Gypsum slurry was produced from 500 ml of water at 40° C. and 500 g of calcium sulphate β-hemihydrate plaster and mixed for 10 seconds in a Kenwood™ Chef Classic blender on a 'low' speed. The slurry included 12.5 g of microsilica.

A portion of the slurry was added to a 150 ml polystyrene cup that was provided with polyurethane thermal insulation. The temperature of the slurry was then measured at regular intervals using a type K thermocouple and the results recorded using a data-logger. These measurements allowed the hydration time (that is, the time to maximum temperature) to be determined.

The other portion of the slurry was poured into moulds and allowed to set to provide gypsum cylinders. After drying at 40° C., the samples were analysed using a dilatometer.

Shrinkage Measurements

The samples of Examples 1-2 and 12-22 and Comparative Examples 1-3 and 5-6 were heated to 1000° C. in a Netzsch dilatometer at 5° C. min$^{-1}$ and their shrinkage measured was measured in-situ with a transducer having a resolution of 8 nm. The results are set out in Table 1.

The samples of Examples 3-11 and Comparative Example 4 were heated to 1000° C. in a furnace at 5° C. min$^{-1}$. Their shrinkage was measured once cooled using digital calipers having a resolution of 0.01 mm. The results are set out in Table 1.

TABLE 1

| Sample | Shrinkage (%) | | |
|---|---|---|---|
| | 500° C. | 750° C. | 1000° C. |
| Example 1 (Specimen a) | 0.25 | 0.44 | 6.53 |
| Example 1 (Specimen b) | 0.29 | 0.47 | 6.76 |
| Example 2 (Specimen a) | 1.95 | 2.33 | 6.14 |
| Example 2 (Specimen b) | 1.97 | 2.50 | 6.79 |
| Example 3 | — | — | 9.7 |
| Example 4 | — | — | 7.8 |
| Example 5 | — | — | 1.5 |
| Example 6 | — | — | 11.0 |
| Example 7 | — | — | 5.7 |
| Example 8 | — | — | 9.0 |
| Example 9 | — | — | 6.2 |
| Example 10 | — | — | 2.1 |
| Example 11 | — | — | 3.5 |
| Example 12 | 2.11 | 3.61 | 8.30 |
| Example 13 | 2.07 | 3.61 | 9.99 |
| Example 14 | 2.10 | 3.90 | 8.14 |
| Example 15 | 2.13 | 3.19 | 10.28 |
| Example 16 | 0.74 | 0.62 | 6.07 |
| Example 17 | 1.42 | 1.37 | 9.37 |
| Example 18 | 2.03 | 3.90 | 10.68 |
| Example 19 | 0.75 | 0.33 | 6.63 |
| Example 20 | 0.91 | 0.89 | 7.16 |
| Example 21 | 0.76 | 0.84 | 6.86 |
| Example 22 | 0.49 | 0.21 | 8.20 |
| Comparative example 1 (Specimen a) | 1.94 | 3.40 | 11.33 |
| Comparative example 1 (Specimen b) | 1.87 | 3.38 | 11.60 |
| Comparative example 2 (Specimen a) | 2.01 | 3.48 | 13.30 |
| Comparative example 2 (Specimen b) | 1.96 | 3.42 | 13.48 |
| Comparative example 3 (Specimen a) | 2.03 | 3.61 | 17.82 |
| Comparative example 3 (Specimen b) | 1.82 | 3.34 | 17.53 |
| Comparative example 4 | — | — | 20.7 |
| Comparative example 5 | 2.22 | 3.97 | 19.60 |
| Comparative example 6 | 2.04 | 3.02 | 10.82 |

Table 1 shows that in Example 2 (in which the Al(H$_2$PO$_4$)$_3$ solution included sufficient calcium hydroxide to bring the pH of the solution to pH 6), shrinkage begins at substantially lower temperatures than in Example 1 (to which no alkali had been added to neutralize the phosphate additive).

The shrinkage of the samples from Comparative Example 3 exceeded the 5 mm measurement range on the dilatometer. Thus, it is assumed that the actual shrinkage of the samples of Comparative Example 3 was greater in magnitude than the value shown in Table 1.

Setting Time

The setting time for Examples 1-4 and Comparative Examples 3 and 4 were measured using a Vicat needle apparatus and are given in Table 2 below.

TABLE 2

| Example | Setting time |
| --- | --- |
| Example 1 | <15 minutes |
| Example 2 | <5 minutes |
| Example 3 | <30 minutes |
| Example 4 | <30 minutes |
| Comparative Example 3 | <15 minutes |
| Comparative Example 4 | <30 minutes |

Hydration Time

The formulations used in examples 10-11 and comparative example 4 were repeated on a smaller scale in a microcalorimeter to determine the total time period over which thermal energy release occurs. This gives an indication of the time required for compete gypsum hydration. The results are given in Table 3.

TABLE 3

| Example | Time to end of thermal energy release (minutes) |
| --- | --- |
| Example 10 | 514 |
| Example 11 | 300 |
| Comparative Example 4 | 150 |

Table 4 sets out the time to maximum temperature for the slurries described in examples 12-22 and comparative examples 5 and 6. Measurement of the time to maximum temperature is an alternative method of determining the relative hydration times of the gypsum slurries.

TABLE 4

| Example | Time to maximum temperature (minutes) |
| --- | --- |
| Comparative example 5 | 15 |
| Comparative example 6 | 15 |
| Example 12 | 15 |
| Example 13 | 15 |
| Example 14 | 15 |
| Example 15 | 17 |
| Example 16 | 28 |
| Example 17 | 17 |
| Example 18 | 16 |
| Example 19 | 26 |
| Example 20 | 8 |
| Example 21 | 7 |
| Example 22 | 11 |

The invention claimed is:

1. A method of manufacturing a calcium sulphate-based product having increased fire resistance, the method comprising the steps of:
   mixing stucco and water to create a stucco slurry;
   adding an aqueous solution of a phosphate additive to the stucco slurry, the phosphate additive constituting 2% or more of the dry weight of the stucco, the phosphate additive including an orthophosphate; and
   allowing the stucco slurry to hydrate and set while the phosphate additive remains in the aqueous solution, whereby the remaining aqueous solution provides fire resistance by delaying dehydration of the calcium sulphate-based product.

2. A method of manufacture according to claim 1, wherein the phosphate additive is selected from a group consisting of sodium phosphate, potassium phosphate, lithium phosphate, calcium phosphate, magnesium phosphate dibasic trihydrate, magnesium phosphate hydrate, zinc phosphate, aluminium phosphate, diammonium hydrogen phosphate, ammonium dihydrogen phosphate, ammonium magnesium phosphate, ammonium aluminium phosphate, potassium aluminium phosphate, and sodium aluminium phosphate.

3. A method of manufacture according to claim 1 wherein the phosphate additive is selected from a group consisting of aluminium phosphate, diammonium hydrogen phosphate, ammonium aluminium phosphate, ammonium dihydrogen phosphate, potassium aluminium phosphate, and sodium aluminium phosphate.

4. A method of manufacture according to claim 1, wherein the phosphate additive includes aluminium.

5. A method of manufacture according to claim 4, wherein the phosphate additive is aluminium phosphate.

6. A method of manufacture according to claim 5, wherein the aluminium phosphate is $Al(H_2PO_4)_3$.

7. A method of manufacture according to claim 1, wherein the phosphate additive includes ammonium ions.

8. A method of manufacture according to claim 1, comprising the further step, before allowing the stucco to hydrate and set, of adding an accelerator to increase the rate of hydration of the stucco.

9. A method according to claim 8, wherein the accelerator is ground gypsum dihydrate and sodium dodecyl benzene sulfonate.

10. A method according to claim 9, wherein the accelerator is added to the stucco slurry in a quantity of 1-5 wt %, relative to the dry weight of the slurry.

11. A method according to claim 1, wherein the phosphate additive constitutes at least 3% of the dry weight of the stucco.

12. A method of manufacturing a calcium sulphate-based product having increased fire resistance, the method comprising the steps of:
   mixing stucco and water to create a stucco slurry;
   adding at least one phosphate to the stucco slurry, the phosphate constituting 2% or more of the dry weight of the stucco, the phosphate being selected from the group consisting of aluminium phosphate, aluminium dihydrogen phosphate, diammonium hydrogen phosphate, ammonium aluminium phosphate, ammonium dihydrogen phosphate, potassium aluminium phosphate, and sodium aluminium phosphate; and
   allowing the stucco slurry to hydrate and set to form a set calcium sulphate-based product.

13. A method of manufacture according to claim 12, wherein the phosphate includes aluminium.

14. A method of manufacture according to claim 13, wherein the phosphate additive is aluminium phosphate.

15. A method of manufacture according to claim 14, wherein the aluminium phosphate is $Al(H_2PO_4)_3$.

16. A method of manufacture according to claim 12, wherein the phosphate additive includes ammonium ions.

17. A method of manufacture according to claim 12, wherein the phosphate constitutes at least 3% of the dry weight of the stucco.

\* \* \* \* \*